F. C. WARNE.

LOCK NUT.

APPLICATION FILED MAR. 15, 1920.

Reissued July 27, 1920. 14,928.

Inventor

Frederick C. Warne

Witness

By Ottel & Billman Attorney

UNITED STATES PATENT OFFICE.

FREDERICK C. WARNE, OF MANSFIELD, OHIO.

LOCK-NUT.

14,928. Specification of Reissued Letters Patent. Reissued July 27, 1920.

Original No. 1,272,584, dated July 16, 1918, Serial No. 144,513, filed January 25, 1917. Application for reissue filed March 15, 1920. Serial No. 366,070.

*To all whom it may concern:*

Be it known that I, FREDERICK C. WARNE, a citizen of the United States, residing at Mansfield, in the county of Richland and State of Ohio, have invented certain new and useful Improvements in Lock-Nuts; and I hereby declare the following to be a full, clear, and exact description of the invention, such as will enable others skilled in the art to which it pertains to make and use the same.

This invention relates to an improvement in nut locks of that type wherein the locking member is formed with a projection, adapted to be forced down into a groove or channel in the bolt, to lock the parts against relative rotation.

In nut locks of this type it is important that the locking member be so constructed and arranged as to afford the maximum strength when locked, without interfering with the capability of the structure for restoring the locking element to normal position for free release of the parts.

Furthermore, particularly in automobile construction, where the applied nuts are sometimes difficult to reach, it is of importance that the nut and locking means be so constructed as to avoid any interference with the use of the usual wrench, ordinarily of the socket type, in applying and removing the nut.

The main object of the present invention, therefore, is a provision of a locking means separate from the nut, and which has a threaded connection with the bolt, and embodies a series of more or less flexible projections or fingers, any one of which, when in register with a groove or channel in the bolt, may be turned down into such channel to secure the applied parts against independent rotative movement on the bolt.

The fingers are of such length that when seated in the channel they will be disposed at an inclination to the longitudinal plane of the bolt other than a right angle, whereby to permit the application of a convenient implement into the groove and beneath the bent finger, to return said finger to normal position beyond the threads of the bolt, to free the locked parts for the unscrewing operation.

The invention is illustrated in the accompanying drawings in whcih:—

Figure 1:
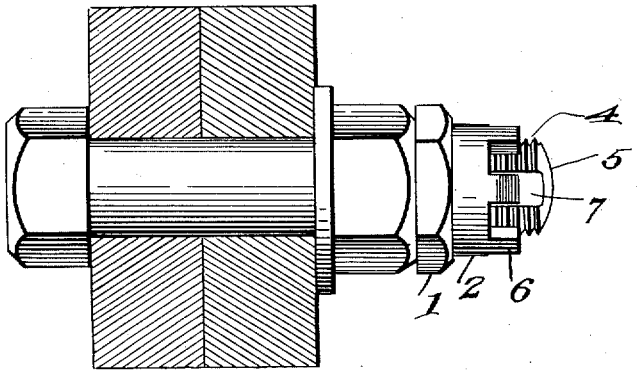
Figure 1 is a view in elevation partly in section, illustrating the improved nut lock, the locking member being shown as integral with the nut.
Figure 2:
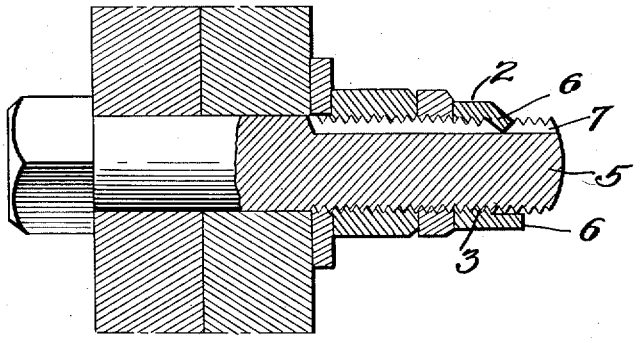
Fig. 2 is a vertical sectional view illustrating the improvement and showing the nut lock member as separate from the nut.
Figure 3:
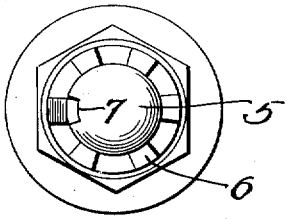
Fig. 3 is a front elevation of the form shown in Fig. 2.
Figure 4:
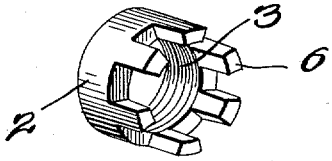
Fig. 4 is a perspective view of the locking member as an independent element.

The locking member may be either separate from the nut 1, as shown in Figs. 2 to 4 of the drawings, integral therewith as shown in Fig. 6 of the drawings, and is formed to provide an annular section 2, having an external diameter approximately equal to the minimum transverse external dimension of the nut, to avoid projection beyond the side surface of the nut. The bore of the projection 2 is coextensive with the bore of the nut and the surface thus provided is threaded at 3 for coöperation with the threads 4 of the bolt 5. Projecting from the free edge of the portion 2 are a series of fingers 6. These fingers may be in any number, more than two, though it is preferred that they be in sufficient number to permit the coöperation of the particular one with a channel 7 formed longitudinally of the bolt, in practically any position of the nut. It has been found that six or eight such fingers will be sufficient number to permit a proper seating of the nut, and operation of the lock, with one or the other of said fingers in proper position for locking coöperation with the channel.

By the term "series" or "plurality" as shown and described herein, and set forth in the attached claims, is meant three or more of such fingers and is not meant to include a locking section having only two of such locking fingers or projections.

An essential feature of the invention resides in so constructing the fingers to form free relatively inner surfaces, that is those surfaces which form a practical continuation of the bore of the nut, are arranged beyond the threaded grooves in said bore, so that when the nut lock is applied the inner surfaces of the fingers will lie wholly beyond and entirely free from the threads of the bolt.

The improved nut lock is constructed with a view to providing maximum strength and at the same time permitting the continued reuse of the locking element. It is to be noted that the locking element has threaded connection with the bolt and that the fingers of the locking element are of such length that when turned down into the groove or channel in bolt such fingers will lie at a forward downward inclination with respect to the bolt, whereby they may be readily restored to normal position by an inserted tool, when desired to release the locking co-operation. Of course it is preferred that in sectional contour and size, the fingers correspond more or less accurately with the similar dimension and shape of the channel 7, and both have their side wall preferably on lines corresponding to radial lines of the bolt, so that as the finger is driven into the channel there will result a comparative wedging action, as shown more particularly in Fig. 3, to more effectively hold the finger in place.

Attention is called to the fact that when the finger is forced out of engagement with the channel by a suitable tool being wedged underneath the end of the finger, the line of least resistance of the finger will be at the point of the projection of the finger from the part 2, therefore the finger will be clearly withdrawn from engagement with the channel or groove without destroying, mutilating or in any way injuring the threads of the bolt, locking member or nut.

What is claimed as new is,—

1. A nut and bolt lock, comprising a bolt having a threaded portion intersected by a longitudinally extending wedge shaped channel, and a nut having an axial cylindrical section having a threaded bore and provided on its margin with a plurality of circularly arranged longitudinally extending spaced fingers surrounding and extending parallel with the threaded portion of said bolt and having outwardly inclined sides adapted to be driven into said wedge shaped channel to wedge within the latter in preventing relative movement between the bolt and nut.

2. A nut having a threaded bore, a bolt, a cylindrical member of less external diameter than the size of the nut and having a threaded bore alining with and forming a continuation of the bore of the nut and a series of circularly arranged fingers projecting from the free edge of such cylindrical member and having their outer and inner surfaces respectively coincident with the outer surface of the cylindrical member and with the base of the threads thereof.

In testimony whereof I have affixed my signature in the presence of two witnesses.

FREDERICK C. WARNE.

Witnesses:

C. A. HINES,

N. P. HENRY.